(12) United States Patent
Gubitose

(10) Patent No.: US 6,426,471 B1
(45) Date of Patent: Jul. 30, 2002

(54) MOUSE PAD SCALE

(75) Inventor: Christopher B. Gubitose, Simpsonville, SC (US)

(73) Assignee: Mettler-Toledo, Inc., Columbus, OH (US)

(*) Notice: Subject to any disclaimer, the term of this patent is extended or adjusted under 35 U.S.C. 154(b) by 0 days.

(21) Appl. No.: 09/538,678

(22) Filed: Mar. 30, 2000

(51) Int. Cl.[7] .................... G01G 19/40; G01G 21/28; G01G 19/00
(52) U.S. Cl. .............. 177/25.15; 177/126; 177/148; 177/239; 177/245; 177/264; 705/401
(58) Field of Search ............... 177/126, 148, 177/238, 239, 240, 241, 242, 243, 244, 245, 264, 25.15; 705/401

(56) References Cited

U.S. PATENT DOCUMENTS

| | | | | | |
|---|---|---|---|---|---|
| 1,201,063 A | * | 10/1916 | Litchfied | ........... | 177/245 |
| 2,476,399 A | * | 7/1949 | Benjamin | ........... | 177/245 |
| 2,687,292 A | * | 8/1954 | Mariani | ........... | 177/245 |
| 2,949,287 A | * | 8/1960 | Linsley | ........... | 177/245 |
| 2,963,286 A | * | 12/1960 | Fischer | ........... | 177/245 |
| 3,043,387 A | * | 7/1962 | Nachsi | ........... | 177/245 |
| 3,243,002 A | * | 3/1966 | Reibold | ........... | 177/238 |
| 3,281,975 A | * | 11/1966 | Simone | ........... | 177/245 |
| 3,811,523 A | * | 5/1974 | Artwick et al. | ........... | 177/238 |
| 4,582,151 A | * | 4/1986 | Mairot et al. | ........... | 177/244 |
| 4,610,324 A | * | 9/1986 | Mexicotte | ........... | 177/245 |
| 5,203,419 A | * | 4/1993 | Douglas | ........... | 177/244 |
| 5,434,367 A | * | 7/1995 | Salini | ........... | 177/189 |
| 6,194,671 B1 | * | 2/2001 | Vaghi | ........... | 177/25.15 |

OTHER PUBLICATIONS

E. Stamp Advertisement for Online Postage, ©1999.

* cited by examiner

*Primary Examiner*—Randy W. Gibson
(74) *Attorney, Agent, or Firm*—Jeffrey Furr

(57) ABSTRACT

A mouse pad is attached to the weighing platform of a scale. The scale electronics are connected to a personal computer through a universal serial bus cable (USB) which also provides power to the scale. The scale may have an integrated, or detached, ergonomically designed wrist-rest with a wrist-rest pad that is positioned to be at the same height above the weighing platform as the mouse pad.

14 Claims, 3 Drawing Sheets

MOUSE PAD SCALE

CROSS-REFERENCES TO RELATED APPLICATIONS (IF ANY)

None

STATEMENT AS TO RIGHTS TO INVENTIONS MADE UNDER FEDERALLY-SPONSORED RESEARCH AND DEVELOPMENT (IF ANY)

None

BACKGROUND

1. Field of the Invention

This invention relates to the art of weighing scales, and more specifically to weighing scales utilized for weighing letters and small packages and determining proper postage therefor.

2. Description of Prior Art

Recently, the use of electronic postage, hereinafter referred to as E-Postage, in offices, homes and other locations, has been increasing. Typically, E-Postage involves the use of a scale, a personal computer (including keyboard and monitor), a computer mouse and mouse pad, and a printer. The scale is used for determining the weight of an item to be mailed or shipped. The computer is utilized for storing, processing and running of software which is designed to apply specific tariff or shipping rate billing data to the weight input from the scale in order to determine proper postage. In some versions of E-Postage, the user must manually enter the weight into the computer. An other versions of E-Postage, the scale is connected directly to the computer and the weight data is automatically captured by the computer.

The computer is typically connected to a printer, which then prints a stamp, or billing authorization, with the proper postage thereon. The stamp is often in the form of a bar code, printed on a label, envelope or directly on the item or parcel to be mailed. The computer may have a modem for connecting to a shipping company's tariff database, or to the post office tariff database, for downloading of current shipping costs or tariff rates into the computer or for uploading of shipping information to the shipper's database. In some cases, downloading of shipping information for purposes of tracking progress of items already shipped or mailed is also accomplished by the computer. Increasingly, the computers used in E-Postage frequently utilize the internet for connecting to and uploading and downloading of such data. Yet other forms of E-Postage may utilize regular shipment or exchange of floppy disks, or other electronic media storage devices such as an EPROM, containing updated tariff rates from the shipping company.

The software programs used for E-Postage are often designed with graphical user interface (GUI) features, such as computer mouse activated windows or software buttons. In many cases, a user will desire to utilize the personal computer for uses other than E-Postage, such as word processing, and the user will typically equip the computer with a mouse and mouse pad for use with such other software programs.

With the exception of the scale, many of the equipment items mentioned above are already found on the typical desktop or workstation today. In addition, it is common to find many other items on the desktop or workstation, such as a stapler, staple remover, pencil and pen holder, paperclip holder and other items. For most users, the result of the introduction and use of E-Postage is the addition of a scale to an already overcrowded desktop or workstation, resulting in less work space being available. It also requires to reading of the postage scale and inputting the information into the computer. These steps increases the chance for errors due to the human intervention. The current method is time intensive and has numerous steps which increases the chances for errors to be introduced.

The addition of a scale and the resultant loss of workspace leaves room for improvement within the art.

1. Field of the Invention

U.S. Class 177-45

2. Description of related art including information disclosed under 37 CFR §1.97**> and 1.98<.

SUMMARY OF THE INVENTION

An object of the present invention is to provide a means to perform E-Postage which minimizes or reduces the amount of space required on the desktop or workstation for the equipment associated with E-Postage.

The inventor of the present invention has reduced the space required to be taken up on the desktop or workstation by the equipment associated with E-Postage. According to one aspect of the invention, the mouse pad is attached to the weighing platform of the scale. The weight of the mouse pad is subtracted, or "tared out", to set the weight of the weighing platform and mouse pad to zero. When the user desires to utilize the computer mouse, the user uses the mouse with the mouse pad that is attached to the weighing platform. When the user desires to use the scale, the user would remove the mouse from the scale, or alternately leave the mouse on the scale but subtract or "tare out" the weight of the mouse, and then weigh the item in question. The scale would then transmit the weight signal to the computer, or to an equivalent input/output data processing device, through a communication means, such as a serial, USB (universal serial bus) or parallel cable. The communication means can also be used to provide power to the scale electronics and associated circuitry. Alternatively, the user can manually enter the weight of the item into the computer.

In yet another aspect of the invention, the scale may be provided with an integrated ergonomically designed wrist-rest. A wrist-rest pad would be attached to the weighing platform and positioned at the same height as the mouse pad relative to the weighing platform. The wrist-rest pad would allow the user to properly align the user's arm and hand for use of the mouse to reduce the likelihood of injury from repetitive motion in using the mouse.

In yet another aspect of the invention, the wrist-rest may be detachable from the scale.

By providing a scale with a mouse pad attached to the weighing platform, the inventor has reduced the space, or footprint, required on the desktop or workstation for the equipment required to perform E-Postage, thus solving, or at least reducing, the problems hereinbefore explained.

BRIEF DESCRIPTION OF THE DRAWINGS.

Without restricting the full scope of this invention, the preferred form of this invention is illustrated in the following drawings.

DESCRIPTION OF THE PREFERRED EMBODIMENT(S)

Figure 1:
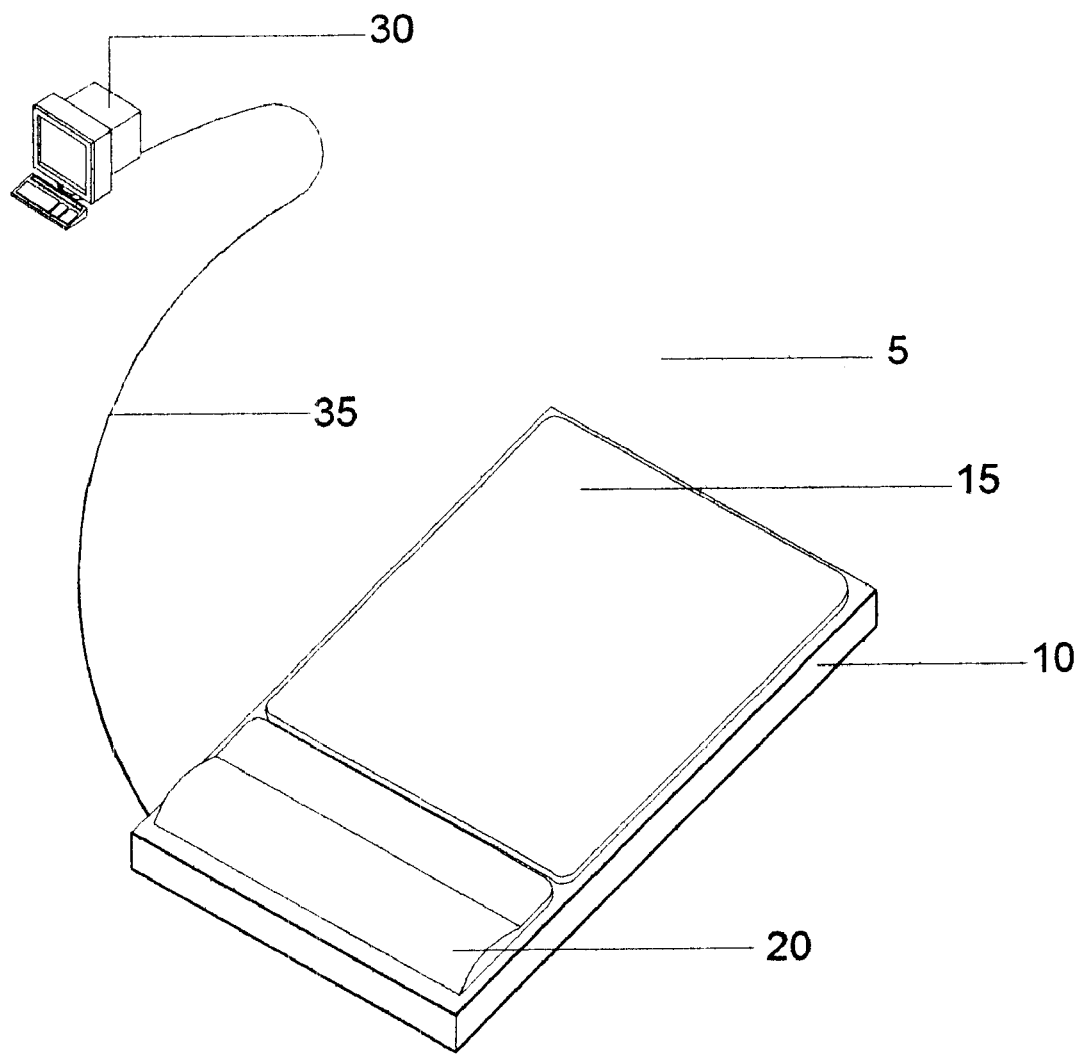
FIG. 1 shows the mouse pad scale with an integrated ergonomically designed wrist-rest.

Referring initially to FIG. 1, there is shown a perspective view of the mouse pad scale, denoted as 5, embodying the present invention. Mouse pad scale 5 includes weighing platform 10, mouse pad 15 and wrist-rest pad 20. Weighing platform 10 is the portion of a scale intended for receiving a load to be weighed. The scale is of the type that is commonly and commercially available and would include load cells or force transducers (not shown) for producing a signal proportional to the weight of an applied load. The scale would also include associated electronic circuitry (also not shown) for processing the signal from the load cells. Given ergonomic considerations, as will be discussed below, it is preferable that weighing platform 10 be as small as possible in height. Weighing platform 10 is preferably made of plastic, but can be constructed of stainless steel or other suitable materials.

Mouse pad 15 is preferably attached to weighing platform 10 with glue, such as a clear polypropylene film, double coated with an acrylic pressure sensitive adhesive. This type of adhesive joins extruded plastics and metal components and bonds EPDM rubbers, urethane foams, and rough or porous surfaces.

Mouse pad 15 would typically be made of a foam rubber material of the type commonly found in use with the variety of computer mice that consist of a single rolling ball for x-y position sensing. Mouse pad 15 could also be made of alternative materials, such as a material with optically absorptive and reflective patterns of the type commonly employed with the variety of computer mice that utilize an optical sensor for detecting x-y position movement. While mouse pad 15 is preferably glued to weighing platform 10, it should be recognized that other attachment methods could be utilized. For example, screws or rivets could be used to attach mouse pad 15 to weighing platform 10. Additionally, friction between the bottom of mouse pad 15 and the top surface of weighing platform 10 could be used to secure mouse pad 15 to weighing platform 10.

Wrist-rest pad 20 is preferably made of foam rubber. Wrist-rest pad 20 is adhered to weighing platform 10 with glue, such as acrylic pressure sensitive adhesive and should be ergonomically designed so as to be at the same height as mouse pad 15 relative to weighing platform 10 in order to reduce the likelihood of repetitive motion injury to the user from using the mouse. As with mouse pad 15, friction between the bottom of wrist-rest pad 20 and weighing platform 10 could be used to secure wrist-rest pad 20 to weighing platform 10, as well as other methods such as screws or rivets. It should be recognized that wrist-rest pad 20 could be made of materials other than foam rubber, such as for example, styrofoam, and still accomplish the ergonomic purpose for which it is intended to serve.

The electronic circuitry (not shown) in weighing platform 10 is connected to a personal computer 30, or some other suitable electronic input/output data processing device, via communication means 35 which in the preferred embodiment is a via a standard communications means or RS232 or Universal Serial Bus(USB) cable at Full-speed. A USB cable consists of four conductors, two power conductors and two signal conductors. A Full-speed cable consists of a signaling twisted pair, VBUS, GND, and an overall shield. A Full-speed cable must be marked to indicate suitability for USB. A Full-speed cable may be used with either Low-speed or Full-speed devices. When Full-speed cable is used with Low-speed devices, the cable must meet all Low-speed requirements. Low-speed cable does not require twisted signaling conductors or the overall shield. Communication means 35 transmits the weight signal from weighing platform 10, for the package or letter being weighed, to computer 30. Computer 30 would typically apply a tariff or shipping rate to the weight signal, and factor in other information deemed relevant, such as destination and timeliness of delivery desired by and inputted by a user. Computer 30 would then calculate proper postage or freight and output same to a printer (not shown) to be printed out in a useable format such as a bar code on a label which would then be applied to the package or letter. Communication means 35 would also preferably supply the power required to operate the electronic circuitry of weighing platform 10. Communication between computer 30 and weighing platform 10 would be accomplished through a commonly used protocol, program or computer language, such as the type of computer programs designed specifically for E-Postage which are commercially available from e-stamp.com or Pitney Bowes.

It should be readily apparent from FIG. 1 that the weight of an item placed anywhere on mouse pad scale 5 will be transferred to the load cells and thus weighed when mouse pad scale 5 is used as a scale. Thus, for a user to obtain valid weights, the user would first need to remove the mouse, and any other item which is not desired to be weighed from mouse pad scale 5, prior to weighing the item which is desired to be weighed. Most scales typically have a feature referred to as a "tear" function. The scale of the preferred embodiment would have a tear function. The tear function subtracts out the weight of an item, such as the weight of a plate if weighing a plate with food and it were desired to only weigh the. food and not the plate. Thus, rather than remove the computer mouse, a user would be able to tear out the weight of the mouse and leave the mouse on the scale during the weighing process.

If it were desired not to allow the wrist-rest pad 20 section of mouse pad scale 5 to be part of the weighing section of mouse pad scale 5, then weighing platform 10 could be integrated with wrist-rest pad 20 into a common base but with separate supports to the common base. In which case, weighing platform 10 would be able to freely transfer the weight of an applied load to the load cells (not shown) without binding upon wrist-rest pad 20 and any weight applied to wrist-rest pad 20 would not effect the weight being sensed on weighing platform 10. Such designs to accomplish this are common in the art of weighing and this is therefore not shown in the drawings.

Additional Embodiments

Figure 2:
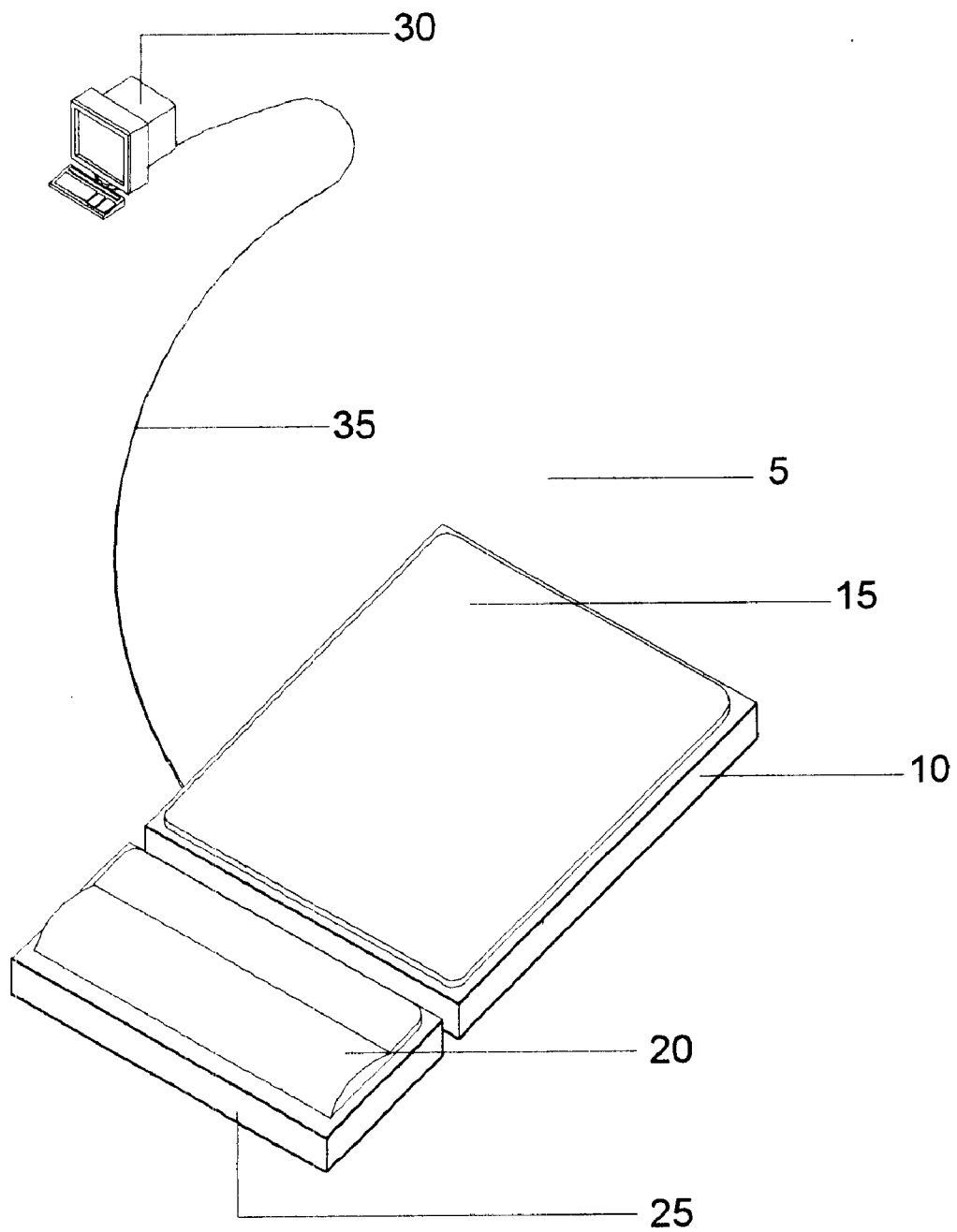
FIG. 2 shows the mouse pad scale with a detachable ergonomically designed wrist-rest.

One additional embodiment, as shown in FIG. 2, would provide a detached wrist-rest section including a base 25 and a wrist-rest pad 20. Wrist-rest pad 20, as described above, would be attached to base 25. Base 25 would preferably be constructed so that wrist-rest pad 20 is at the same height as mouse pad 15. By providing a detached base 25, the user is able to place, move or remove base 25 as desired. Base 25 is preferably constructed of plastic but could also be made of stainless steel or other suitable materials.

Figure 3:
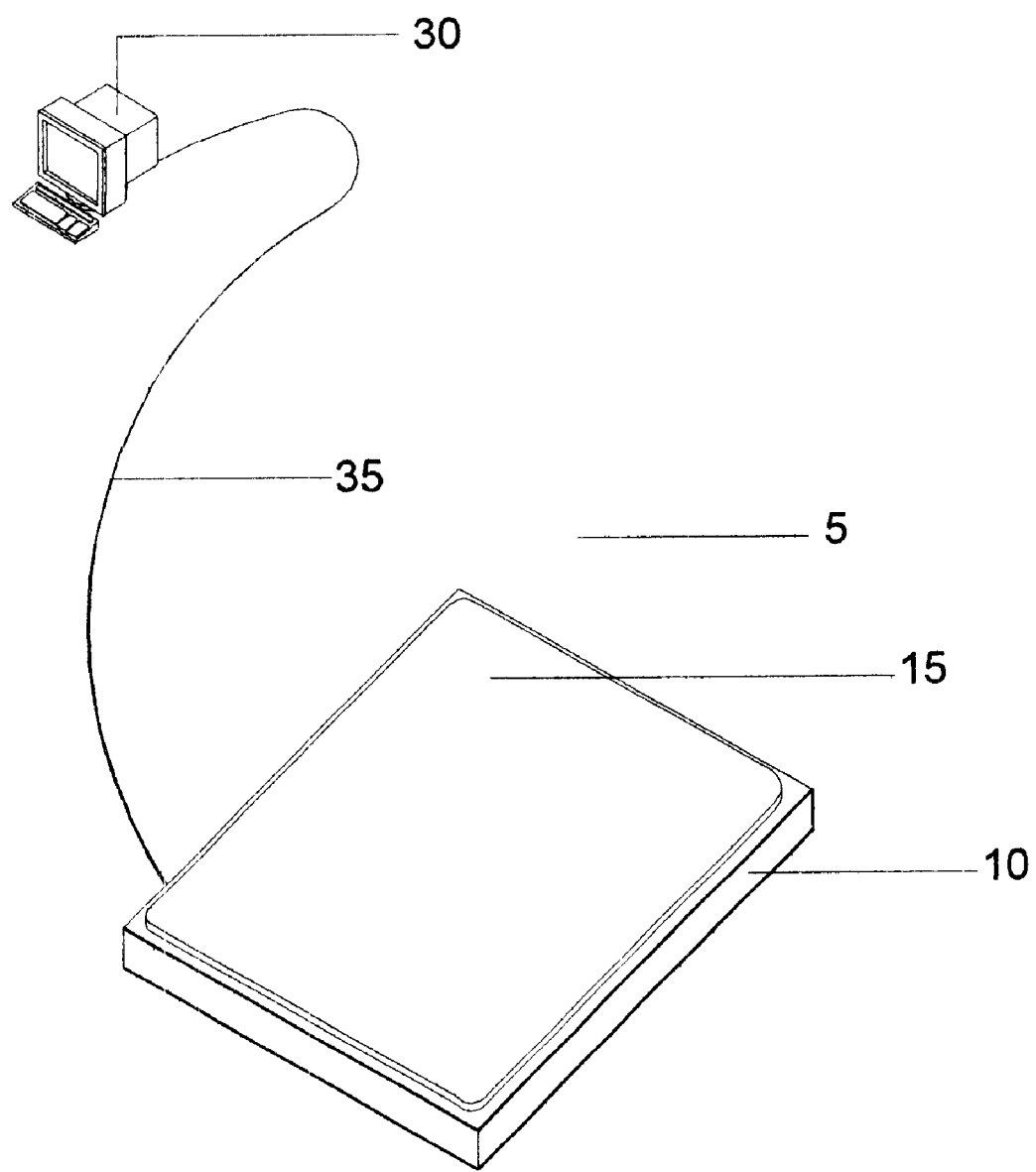
FIG. 3 shows the mouse pad scale without any wrist-rest.

Yet another additional embodiment, as shown in FIG. 3, is to provide the weighing platform 10 and mouse pad 15 without any wrist-rest section or wrist-rest pad.

Operation

To use mouse pad scale 5 to weigh parcels or letters needing postage, the user would simply remove any items that are on mouse pad 15 that have not been set to a zero weight, for example, by a tear function. The user would then place the parcel or letter on mouse pad 15 and enter appropriate commands and information as needed by the program being used by computer 30 to initiate the weighing and calculation of postage process. The weighing platform 10 would then transmit the weight signal via communication means 35 to computer 30 where it would be combined with other data and a proper postage determined and printed on a printer (not shown). Or alternatively, the user could input the weight directly into computer 30 via the keyboard. To use mouse pad scale 5 as a mouse pad, the user would simply place and use the mouse on mouse pad 15 and operate the mouse in combination with software being run on computer 30. If desired, the user would also make appropriate use of the wrist-rest pad 20.

Advantages

The previously described embodiments of the present invention have many advantages including ease of use and reduction in the number of items that are required to be on a desktop. The present invention adds to the efficiency and productiveness of the user.

Although the present invention has been described in considerable detail with reference to certain preferred versions thereof, other versions are possible. For example, the mouse pad could be made out of a material that is not foam rubber or the communications mean could be cable wire, fiber optics or some other type of communication. Therefore, the point and scope of the appended claims should not be limited to the description of the preferred versions contained herein.

What is claimed is:

1. A scale comprising:
   a) a weighing platform for receiving a load to be weighed,
   b) a mouse pad attached to the weighing platform, and
   c) a wrist-rest pad attached to the weighing platform.

2. The scale according to claim 1 wherein the mouse pad is attached to the weighing platform with glue.

3. The scale according to claim 1 wherein the mouse pad is attached to the weighing platform by friction.

4. The scale according to claim 1 wherein the wrist-rest pad is attached to the weighing platform with glue.

5. The scale according to claim 1 wherein the wrist-rest pad is attached to the weighing platform by friction.

6. The scale according to claim 1 wherein the wrist-rest pad is the same height above the weighing platform as the mouse pad.

7. A system comprising:
   a) a scale having a weighing platform for receiving a load to be weighed.
   b) a mouse pad attached to said weighing platform.
   c) said weighing platform for producing a signal proportional to the weight of an applied load.
   d) Communication means for connecting said weighing platform to an external input/output data processing device, and
   e) a base having a wrist-rest pad attached thereon, for placement next to said scale.

8. the system according to claim 7 wherein the mouse pad is attached to the weighing platform with glue.

9. The system according to claim 7 wherein the mouse pad is attached to the weighing platform by friction.

10. The system according to claim 7 wherein the wrist-rest pad is attached to said base with glue.

11. The system according to claim 7 wherein the wrist-rest pad is attached to said base by friction.

12. The system according to claim 7 wherein the wrist-rest pad is the same height above the weighing platform as the mouse pad.

13. The system according to claim 7 wherein said communication means consists of a Universal Serial Bus Cable.

14. The system according to claim 7 wherein the external input/output data processing device is a personal computer.

* * * * *